3,062,881
1-(CYCLOALKANOYL)- AND 1-(TRI-ALKYL-ACETYL)-2,2-(DI-SUBSTITUTED)-HYDRAZINE COMPOUNDS

Hugo Gutmann, Reinach, Basel-Land, Switzerland, assignor to Hoffmann-La Roche Inc., Nutley, N.J., a corporation of New Jersey
No Drawing. Filed June 29, 1960, Ser. No. 39,463
Claims priority, application Switzerland July 8, 1959
12 Claims. (Cl. 260—557)

This invention relates to substituted acid hydrazides having the formula

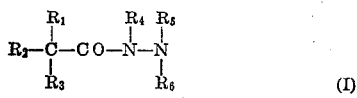

wherein $R_1$ and $R_2$ represent individually lower alkyl groups or join together to form a lower alkylene residue, $R_3$ represents hydrogen or lower alkyl, $R_4$ represents hydrogen, lower alkyl, lower alkenyl, phenyl lower alkyl or cycloalkyl, (cycloalkyl)lower alkyl or (lower alkyl cycloalkyl)lower alkyl derived from alicyclic hydrocarbon groups having 3 to 6 carbon atoms and $R_5$ and $R_6$ each represents lower alkyl, lower alkenyl, phenyl lower alkyl or cycloalkyl (cycloalkyl)lower alkyl or (lower alkyl cycloalkyl)lower alkyl derived from alicyclic hydrocarbon groups having 3 to 6 carbon atoms, not more than one of the substituents represented by $R_4$, $R_5$ and $R_6$ being a pheny lower alkyl group, and salts of such compounds.

The groups in the above formula represented by $R_1$, $R_2$ and $R_3$ represent straight chain and branched chain saturated aliphatic groups such as methyl, ethyl, n-propyl, isopropyl, n-butyl, sec.-butyl, tert.-butyl, amyl, etc. The groups $R_1$ and $R_2$ in addition may be joined together in a lower alkylene moiety which, together with the carbon atom to which they are attached (adjacent to the carbonyl group), form an alicyclic group having 3 to 6 carbon atoms, i.e. cyclopropane, cyclobutane, cyclopentane or cyclohexane, especially cyclopropane. $R_4$, $R_5$ and $R_6$ represent lower alkyl groups and alicyclic groups of the same type described as well as lower alkenyl groups such as allyl, butenyl and the like, and phenyl lower alkyl groups such as benzyl, α-methylbenzyl, phenylethyl and the like. The alicyclic groups may also carry lower alkyl substituents and be bound with the nitrogen atom over a lower alkyl group. Not more than one of the symbols $R_4$, $R_5$ or $R_6$ represents a phenyl lower alkyl group in a given compound, the remaining two symbols representing other substituents as defined above. Especially preferred substituents represented by the symbols $R_4$, $R_5$ and $R_6$ are ethyl, isopropyl, sec.-butyl, or benzyl. From the pharmacological point of view, those hydrazides derived from trimethylacetic acid or 1-methyl-cyclopropanecarboxylic acid and wherein $R_4$ represents hydrogen, one of the groups $R_5$ and $R_6$ represents a phenyl lower alkyl group and the other represents a lower alkyl group are especially useful.

Representative acid hydrazides of this invention are the following:

1-trimethylacetyl-2,2-diisopropylhydrazine
1-(1-methylcyclopropanecarbonyl)-2-ethyl-2-butylhydrazine
1-(1-methylcyclopropanecarbonyl)-2-ethyl-2-benzylhydrazine
1-(1-methylcyclopropanecarbonyl)-2-benzyl-2-isopropylhydrazine
1-trimethylacetyl-2-benzyl-2-isopropylhydrazine
1-(1-methylcyclopropanecarbonyl)-2-benzyl-2-cyclopropylhydrazine
1-(ethyldimethylacetyl)-2-benzyl-2-cyclopropylmethylhydrazine
1-(diethylmethylacetyl)-2-cyclopentyl-2-phenethylhydrazine
1-cyclopentanecarbonyl-2-benzyl-2-isopropylhydrazine
1-triethylacetyl-2-isobutyl-2-α-methylbenzylhydrazine
1-trimethylacetyl-2-allyl-2-benzylhydrazine
1-(1-methylcyclopropanecarbonyl)-2-isopropyl-2-(α-methylphenethyl)-hydrazine
1-trimethylacetyl-1,2,2-triisopropylhydrazine
1-(1-methylcyclopentanecarbonyl)-2-benzyl-1,2-diisopropylhydrazine
1-trimethylacetyl-1-allyl-2-benzyl-2-isopropylhydrazine
1-(1-methylcyclopropanecarbonyl)-1-benzyl-2,2-diisopropyl-hydrazine
1-trimethylacetyl-2-benzyl-1,2-diallylhydrazine
1-trimethylacetyl-2,2-diethyl-1-phenethylhydrazine
1-(1-methylcyclopropanecarbonyl)-2-ethyl-2-butyl-1-(α-methylphenethyl)-hydrazine
1-isobutyroyl-2-benzyl-2-isopropylhydrazine
1-cyclopropanecarbonyl-2-ethyl-2-butylhydrazine
1-cyclohexanecarbonyl-2-allyl-2-ethylhydrazine
1-(2-methylvaleroyl)-1-benzyl-2,2-diisopropylhydrazine.

Compounds of the class described above may be produced in general by reacting an acid of the formula

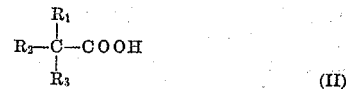

or a reactive functional derivative thereof with a hydrazine of the formula

wherein $R_7$, $R_8$ and $R_9$ each represents hydrogen, lower alkyl, lower alkenyl, phenyl lower alkyl, or cycloalkyl, (cycloalkyl)lower alkyl or (lower alkyl cycloalkyl)lower alkyl derived from alicyclic hydrocarbon groups having 3 to 6 carbon atoms, not more than one of the groups $R_7$, $R_8$ or $R_9$ being phenyl lower alkyl, then, if desired, reducing any double bonds and/or introducing additional substituents represented by $R_4$, $R_5$ or $R_6$ not already in the molecule. The reaction of the acid compound with the hydrazine of Formula III is effected by using about equimolar proportions of the reactants in an inert solvent.

If a free acid of Formula II is used to react with a monosubstituted hydrazine or a disubstituted hydrazine derivative containing both substituents on the same nitrogen, the condensation is preferably carried out in the presence of an N,N'-carbodiimide. Any carbodiimide may be used for the condensation reaction, since the groups attached to the carbodiimide radical do not interfere with the principal reaction. Illustrative groups which may be attached to the carbodiimide radical include lower alkyl groups, such as methyl, ethyl and the like, cycloalkyl groups such as cyclohexyl and the like and aromatic groups such at tolyl, benzyl and the like. N,N'-dicyclohexyl-carbodiimide is preferred. Such disubstituted carbodiimides may be produced, for example, by treating a disubstituted urea with p-toluenesulfonyl chloride in pyridine. During the reaction the carbodiimide is converted to a urea derivative. By using appropriately substituted carbodiimides, urea derivatives which may be readily separated from the reaction product are formed as byproducts. The reaction may be carried out at a temperature between 0° and 50°, preferably at room temperature or a slightly elevated temperature.

Reactive acid derivatives which may be used are acid halides, especially the chloride, esters, e.g. lower alkyl esters or anhydrides. Symmetrical acid anhydrides which are formed from two molecules of the acid containing the desired acyl group may be used as well as mixed anhydrides, for example those formed from lower alkanecarboxylic acids or with carbonic acid monoesters.

When $R_8$ and/or $R_9$ in the hydrazine derivative used as starting material in the first step represent hydrogen, then the groups $R_5$ and/or $R_6$ may be introduced in a subsequent step. The introduction of these substituents may be effected, for example, by reacting the acid hydrazine obtained as a result of the condensation reaction with a reagent yielding the $R_5$ or $R_6$ group, for example, ethyl bromide, benzyl chloride, isopropyl iodide, methyl tosylate or dimethyl sulfate, in the presence of a base, e.g. an alkali metal alcoholate such as sodium ethoxide, an alkali metal amide, an alkali metal hydride, alkali metals or a tertiary organic base such as pyridine. Alternatively an $N^2$-monosubstituted acid hydrazide formed in the first step may be further acylated and the second acyl group selectively reduced with lithium aluminium hydride. As a further alternative it is also possible in the first reaction step to treat two molecules of the acid or a reactive derivative thereof with a hydrazine derivative of the general formula $$H_2N-NH-R_5 \qquad (IV)$$

whereby on $N^1,N^2$-diacylated product is obtained. By subsequent reduction with lithium aluminium hydride, the acyl group on the same nitrogen atom as the $R_5$ group is reduced to a hydrocarbon group. If both $R_5$ and $R_6$ represent hydrogen, another substituent may be introduced by treating with a carbonyl compound, for example, acetone, methyl ethyl ketone, benzaldehyde or the like, and thereafter reducing the hydrazone formed, for example, by catalytic hydrogenation using platinum or palladium-carbon catalyst or treatment with lithium aluminium hydride. In an additional step, any other unsaturated groups may be hydrogenated in conventional manner.

The substituted acid hydrazides of this invention form well-defined salts with inorganic as well as with organic acids, for example with hydrohalic acids, such as hydrochloric acid, hydrobromic acid, hydroiodic acid, etc., with other mineral acids such as sulfuric acid, phosphoric acid, nitric acid, and with organic acids such as tartaric acid, citric acid, camphorsulfonic acid, ethanesulfonic acid, salicyclic acid, ascorbic acid, maleic acid, madelic acid, etc. Preferred salts are the hydrohalides, especially the hydrochloride. The acid addition salts may be produced by treating the hydrazine derivative in an inert solvent with an excess of the acid corresponding to the salt desired.

The product of this invention are monoamine oxidase inhibitors which deactivate physiological regulators such as serotonin, tryptamine, epinephrine, etc., and thereby stimulate the central nervous system. They are useful as anti-depressants and also serve to increase weight in cases of cachexia. The free hydrazine compound or a medicinally acceptable acid addition salt thereof may be administered orally or parenterally in conventional solid or liquid dosage forms such as tablets, capsules, injectables, and the like.

The following examples illustrate the invention. Temperatures are stated on the centigrade scale.

Example 1

10.2 g. of trimethylacetic acid, 10.1 g. of triethylamine and 15.8 g. of benzylhydrazine mono-hydrochloride were stirred in 300 ml. of acetonitrile for 1 hour at room temperature. 20.6 g. of dicyclohexyl-carbodiimide were added and the mixture was stirred for about 3 more hours with care being taken that the temperature of the reaction mixture did not exceed 30°. The precipitated dicyclohexyl urea was filtered off, the solvent was evaporated from the filtrate in vacuo and the residue was taken up in ether. The ether solution was first shaken with sodium bicarbonate solution. Then the solution was extracted several times with 3 N hydrochloric acid. The extracts were combined and adjusted to pH 7-8 by addition of sodium hydroxide solution. By extraction with ether and evaporation of the solvent, there was obtained 1-trimethylacetyl-2-benzylhydrazine, M.P. 68-69°.

20.6 g. of 1-trimethylacetyl-2-benzylhydrazine were dissolved in 50 ml. of 2 N sodium alcoholate and 18 g. of isopropyl bromide were added. The reaction mixture was heated at reflux for 4 hours, then concentrated in vacuo. The residue was taken up in ether, washed with water, dried and again concentrated. After recrystallization of the residue from ethyl acetate, the 1-trimethylacetyl-2-benzyl-2-isopropylhydrazine melted at 138°.

Example 2

11 g. of trimethylacetyl chloride were dissolved in 75 ml. of pyridine and 10.3 g. of 1,1-diisopropylhydrazine were added. The mixture was permitted to stand for 4 hours at room temperature and then concentrated in vacuo. The residue was taken up in methylene chloride and shaken with saturated potassium carbonate solution. The methylene chloride solution was then dried with anhydrous potassium carbonate and concentrated. After crystallizing from petroleum ether, 1-trimethylacetyl-2,2-diisopropylhydrazine was obtained in the form of needles melting at 134-135°.

Example 3

20.6 g. of 1-trimethylacetyl-2-benzylhydrazine were dissolved in 100 ml. of 1 N sodium alcoholate, 14.2 g. of methyl iodide were added and the mixture was heated at reflux for 1½ hours. The reaction mixture was concentrated and the residue was distributed between ether and water. The ether layer was washed with water, dried and concentrated. The residue was crystallized from petroleum ether to obtain 1-trimethylacetyl-2-benzyl-2-methylhydrazine, M.P. 106-107°.

Example 4

20.6 g. of 1-trimethylacetyl-2-benzylhydrazine were dissolved in 100 ml. of 1 N sodium alcoholate, 10.9 g. of ethyl bromide were added and the mixture was heated at reflux for 1½ hours. The mixture was then concentrated and the residue was distributed between ether and water. The ether layer was washed with water, dried and evaporated. The residue was crystallized from petroleum ether to obtain 1-trimethylacetyl-2-ethyl-2-benzylhydrazine, M.P. 104-106°.

Example 5

20.6 g. of 1-trimethylacetyl-2-benzylhydrazine were dissolved in 100 ml. of 1 N sodium alcoholate, 12.1 g. of allyl bromide were added and the mixture was heated at reflux for 1½ hours. The reaction mixture was then concentrated and the residue was distributed between ether and water. The ether layer was washed with water, dried and concentrated. After crystallizing the residue from petroleum ether, 1-trimethylacetyl-2-allyl-2-benzylhydrazine was obtained, M.P. 98-99°.

24.6 g. of 1-trimethylacetyl-2-allyl-2-benzylhydrazine were dissolved in 250 ml. of alcohol and shaken with 1 g. of platinum oxide catalyst in a hydrogen atmosphere until the amount of hydrogen calculated for the reduction of one double bond was absorbed. The catalyst was then filtered off, the filtrate was concentrated and the residue was crystallized from petroleum ether. The product, 1-trimethylacetyl-2-benzyl-2-propylhydrazine, was obtained in the form of crystals melting at 107-108°.

Example 6

20.6 g. of 1-trimethylacetyl-2-benzylhydrazine were dissolved in 100 ml. of 1 N sodium alcoholate, 13.7 g. of butyl bromide were added and the mixture was heated at reflux for 1½ hours. The reaction mixture was concentrated and the residue was distributed between ether and water. The ether layer was washed with water, dried and evaporated. After crystallizing the residue from petroleum ether, 1-trimethylacetyl-2-benzyl-2-butylhydrazine was obtained, M.P. 96-97°.

Example 7

11.6 g. of trimethylacetic acid hydrazide were dissolved in 50 ml. of alcohol, 8.6 g. of trimethylacetaldehyde were added and the mixture was heated at reflux for ½ hour. Upon cooling, 1-trimethylacetyl-2-(2,2-dimethylpropylidene)hydrazine crystallized, M.P. 212–213°.

18.4 g. of the product obtained above were dissolved in 200 ml. of a 10% methanolic solution of acetic acid and shaken with platinum oxide catalyst in a hydrogen atmosphere. After absorption of the calculated proportion of hydrogen, the catalyst was filtered off, the filtrate was concentrated and the residue was taken up in ether. The ether solution was shaken with saturated sodium carbonate solution and dried with anhydrous potassium carbonate. The residue obtained after evaporating the ether was crystallized from petroleum ether to obtain 1-trimethylacetyl-2-neopentylhydrazine, M.P. 112–114°.

18.6 g. of 1-trimethylacetyl-2-neopentylhydrazine were dissolved in 100 ml. of 1 N sodium alcoholate, 12.7 g. of benzyl chloride were added and the mixture was heated at reflux for 3 hours. The mixture was concentrated and the residue was distributed between ether and water. The ether layer was washed with water, dried and evaporated. After crystallizing the residue from petroleum ether, the 1-trimethylacetyl-2-benzyl-2-neopentylhydrazine obtained melted at 109–110°.

Example 8

20.6 g. of 1-trimethylacetyl-2-benzylhydrazine were heated in 100 ml. of acetic anhydride for 2 hours on the steam bath, then concentrated under water vacuum. The residue was taken up in ether and the ether solution was washed with saturated sodium bicarbonate solution, dried and evaporated. Upon treating with petroleum ether, 1-trimethylacetyl-2-acetyl-2-benzylhydrazine crystallized in the form of needles, M.P. 115–117°.

24.8 g. of 1-trimethylacetyl-2-acetyl-2-benzylhydrazine in 1 liter of absolute ether were treated portionwise with 3.8 g. of lithium aluminium hydride. The mixture was stirred for 5 hours at room temperature, 10 ml. of water were added dropwise with cooling and then heated at reflux for ½ hour. The mixture was filtered and the filtrate was concentrated. The residue was crystallized from petroleum ether to obtain 1-trimethylacetyl-2-ethyl-2-benzylhydrazine, M.P. 105–107°.

Example 9

114 g. of 1-methylcyclopropanecarboxylic acid methyl ester were heated at reflux for 15 hours with 100 ml. of 100% hydrazine hydrate. The reaction product was distilled and the fraction boiling at 71–72°/0.1 mm. was crystallized from petroleum ether. There was thus obtained 1-methylcyclopropanecarboxylic acid hydrazide in the form of plates melting at 72–74°.

11.4 g. of 1-methylcyclopropanecarboxylic acid hydrazide were dissolved in 200 ml. of petroleum ether (boiling range 70–80°) by heating. After the addition of 11 g. of benzaldehyde, the mixture was heated under a condenser until no water distilled over. The 1-(1-methylcyclopropanecarbonyl)-2-benzylidene hydrazine crystallized and, upon cooling, was filtered off, M.P. 156–158°. 19.5 g. thereof were dissolved while cooling with ice in 200 ml. of tetrahydrofuran and added portionwise with 3.7 g. of lithium-aluminium hydride. The mixture was stirred for 15 hours at room temperature, cautiously added while cooling with 10 ml. of water, stirred for a further hour at 40° and filtered. The filtrate was concentrated and the residue was crystallized from petroleum ether. The 1-(1-methylcyclopropanecarbonyl)-2-benzyl-hydrazine obtained melted at 71–72°.

20.4 g. of 1-(1-methylcyclopropanecarbonyl)-2-benzylhydrazine were heated on a steam bath in 100 ml. of acetic anhydride for 2 hours, then concentrated under water vacuum. The residue was taken up in ether and the ether solution was washed with saturated sodium bicarbonate solution, dried and evaporated. Upon treating with petroleum ether, 1-(1-methylcyclopropanecarbonyl)-2-acetyl-2-benzylhydrazine crystallized in the form of needles melting at 95–97°. 24.6 g. of this product were dissolved in 2 liters of absolute ether and treated portionwise with 3.8 g. of lithium aluminium hydride. The reaction mixture was heated at reflux for 4 hours, 10 ml. of water were added dropwise with cooling and heated at reflux for ½ hour. The mixture was filtered and the filtrate was concentrated. The residue was crystallized from petroleum ether to obtain 1-(1-methylcyclopropanecarbonyl) - 2 - ethyl - 2 - benzylhydrazine, M.P. 88–89°.

Example 10

186 g. of N-benzyl-isopropylamine hydrochloride in 200 ml. of water were added dropwise, at 75°, with a solution of 70 g. of sodium nitrite in 250 ml. of water. The temperature was then kept for 2 hours at 75°, whereupon the mixture was cooled down and the oil that separated taken up in ether. The ether solution was washed with dilute hydrochloric acid and water, dried and concentrated, and the residual oil was distilled. The N-benzyl-isopropyl-nitrosamine thus obtained had B.P. 77°/0.04 mm., $n_D^{22}=1.5275$.

178 g. of the above product were dissolved in 1.5 litres of absolute ether and added dropwise, while stirring, to a solution of 76 g. of lithium aluminium hydride in 1.5 liters of absolute ether. The mixture was then boiled for 2 hours, while stirring, whereupon 200 ml. of water were cautiously added dropwise, while cooling with ice. Boiling was continued for one more hour, the mixture was filtered and the filter cake extracted with boiling ether. The combined ether extracts were concentrated and the residue distilled. The thus obtained 1-benzyl-1-isopropylhydrazine had B.P. 45°/0.05 mm.

$$n_D^{22}=1.5160$$

16.4 g. of 1-benzyl-1-isopropylhydrazine were dissolved in 100 ml. of pyridine, added with 12.2 g. of trimethylacetyl chloride and heated for 2 hours at 60°. The reaction mixture was then concentrated in vacuo, the residue was distributed between ether and water, and the ether layer was washed with water, dried with potassium carbonate and concentrated. The crystalline residue was recrystallized from ethyl acetate and melted at 136°. It was identical with the product obtained according to Example 1.

Example 11

13.6 g. of 1-benzyl-1-methylhydrazine were dissolved in 100 ml. of pyridine, added with 12.2 g. of trimethylacetyl chloride and heated for 2 hours at 60°. The reaction mixture was concentrated in vacuo, the residue was distributed between ether and water, and the ether layer was washed with water, dried with potassium carbonate and concentrated. The crystalline residue was recrystallized from petroleum ether and melted at 107°. It was identical with the product obtained according to Example 3.

Example 12

20.4 g. of the 1-(1-methylcyclopropanecarbonyl)-2-benzylhydrazine obtained according to Example 9 were dissolved in 100 ml. of 1 N sodium alcoholate, added with 12.5 g. of isopropylbromide and refluxed for 3 hours. The reaction mixture was concentrated, the residue distributed between ether and water, the ether layer was washed with water, dried and concentrated. Upon recrystallization of the residue from petroleum ether, there was obtained 1-(1-methylcyclopropanecarbonyl)-2-benzyl-2-isopropylhydrazine, M.P. 125–126°.

I claim:
1. A compound selected from the group consisting of hydrazines of the formula

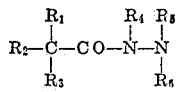

wherein $R_1$ and $R_2$ represent radicals selected from the group consisting of lower alkyl individually and lower alkylene conjointly, $R_3$ represents a member of the group consisting of hydrogen and lower alkyl and is lower alkyl when $R_1$ and $R_2$ are lower alkyl, $R_4$ represents a member of the group consisting of hydrogen, lower alkyl, lower alkenyl, phenyl lower alkyl and cycloalkyl, (cycloalkyl)lower alkyl and (lower alkyl cycloalkyl)lower alkyl derived from alicyclic hydrocarbon groups having 3 to 6 carbon atoms and $R_5$ and $R_6$ each represents a member of the group consisting of lower alkyl, lower alkenyl, phenyl lower alkyl and cycloalkyl, (cycloalkyl)lower alkyl and (lower alkyl cycloalkyl)lower alkyl derived from alicyclic hydrocarbon groups having 3 to 6 carbon atoms, at most one of the symbols $R_4$, $R_5$ and $R_6$ representing phenyl lower alkyl, and medicinally acceptable acid addition salts of said hydrazines.

2. 1-tri(lower alkyl)acetyl-2-phenyl lower alkyl-2-lower alkylhydrazine.
3. 1-tri(lower alkyl)acetyl-2,2-di(lower alkyl)hydrazine.
4. 1-(1-lower alkyl-cycloalkylcarbonyl)-2-phenyl lower alkyl-2-lower alkylhydrazine.
5. 1-trimethylacetyl-2-benzyl-2-isopropylhydrazine.
6. 1-trimethylacetyl-2,2-diisopropylhydrazine.
7. 1-trimethylacetyl-2-ethyl-2-benzylhydrazine.
8. 1-trimethylacetyl-2-allyl-2-benzylhydrazine.
9. 1-trimethylacetyl-2-n-butyl-2-benzylhydrazine.
10. 1-trimethylacetyl-2-n-propyl-2-benzylhydrazine.
11. 1 - (1 - methylcyclopropanecarbonyl) - 2 - ethyl-2-benzylhydrazine.
12. 1 - (1 - methylcyclopropanecarbonyl) - 2 - benzyl-2-isopropylhydrazine.

References Cited in the file of this patent
UNITED STATES PATENTS

| | | |
|---|---|---|
| 2,843,598 | Donovan | Oct. 22, 1956 |
| 2,928,875 | Martin et al. | Mar. 15, 1960 |
| 2,931,811 | Hallmann | Apr. 5, 1960 |
| 2,992,269 | Horrom et al. | July 11, 1961 |

OTHER REFERENCES

Weiland: Die Hydrazine, pages 45–46, published by Ferdinan Enke (Stuggart) (1913).
Beilstein's Handbuch der Organischen Chemie, (4th ed.), vol. 15, Original Work, pages 244–248 (1932).
Biel et al.: Journal American Chemical Society, vol. 81, pages 2805–2813 (June, 1959).
Zeller et al.: Annals of the New York Academy of Science, vol. 80, Art. 3, pages 555–567 (Sept. 17, 1959).